UNITED STATES PATENT OFFICE.

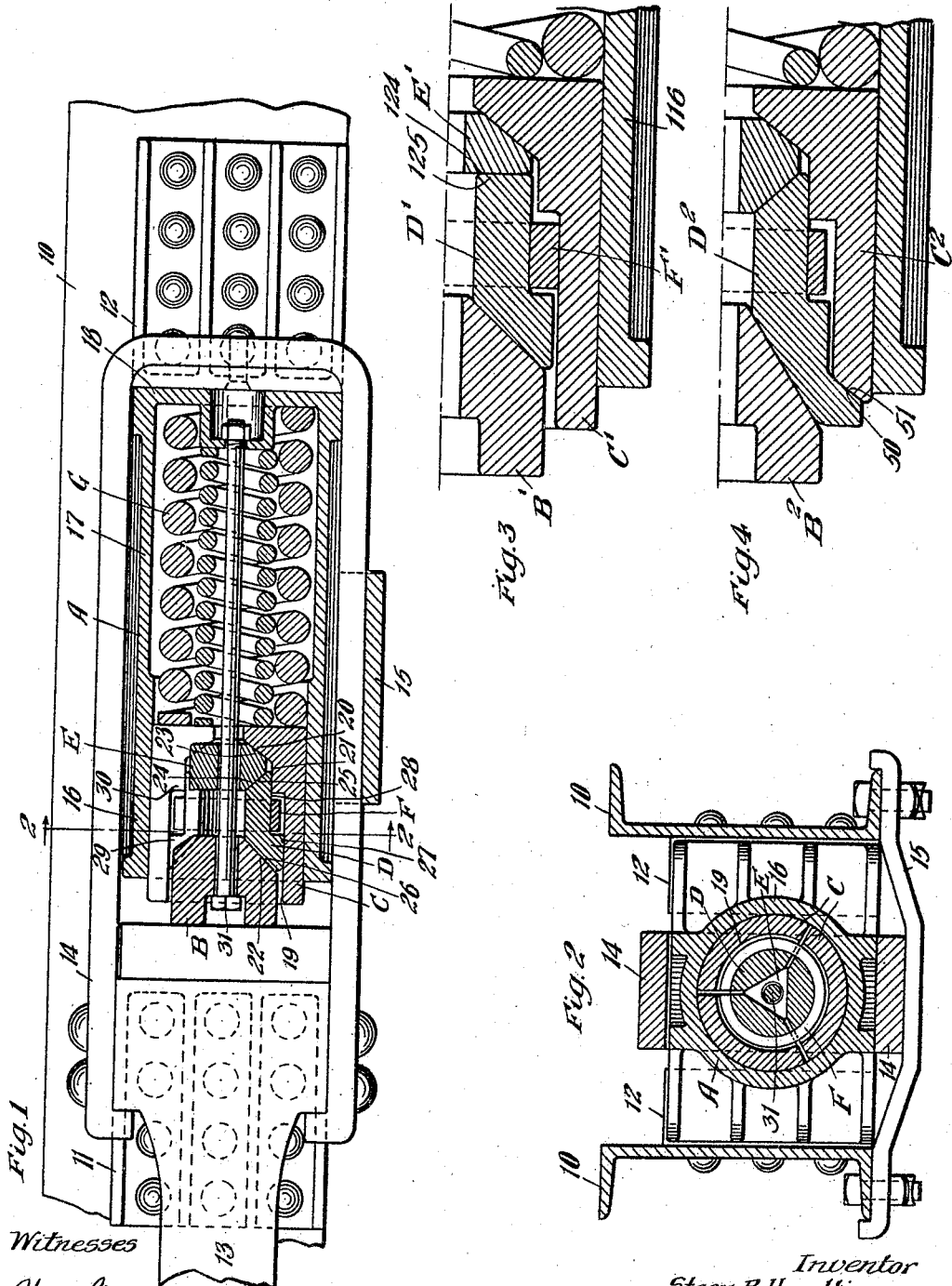

STACY B. HASELTINE, OF CHICAGO, ILLINOIS, ASSIGNOR TO WILLIAM H. MINER, OF CHAZY, NEW YORK.

FRICTION SHOCK-ABSORBING MECHANISM.

1,398,691. Specification of Letters Patent. Patented Nov. 29, 1921.

Application filed May 26, 1920. Serial No. 384,322.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanism.

The object of the invention is to provide a friction shock absorbing mechanism especially adapted for railway draft riggings wherein means are provided for insuring certain release of the friction elements.

More specifically, the object of the invention is the provision of a friction shock absorbing mechanism employing, among other elements, a plurality of radially expanding wedging means in combination with spring means for effecting collapse of the spreading means upon removal of the actuating pressure.

In the drawing forming a part of this specification, Figure 1 is a vertical, longitudinal sectional view of a portion of a railway draft rigging showing my improvements in connection therewith, the drawbar, front follower and yoke being indicated in side elevation. Fig. 2 is a vertical transverse sectional view taken substantially of the line 2—2 of Fig. 1. Fig. 3 is an enlarged detail sectional view illustrating another embodiment of the invention. And Fig. 4 is a view similar to Fig. 3 but illustrating a still further embodiment of my invention.

In said drawing, 10—10 denotes channel shaped center or draft sills of a railway car to the inner faces of which are secured front stop lugs 11 and rear stop lugs 12. A portion of a drawbar is indicated at 13, the same having riveted thereto a yoke strap 14 of well known form. The parts are adapted to be supported by a detachable saddle plate 15 of usual construction.

The improved shock absorbing mechanism, as shown, comprises, broadly, a combined friction shell and spring cage A; a main wedge or spreader B; a plurality of friction shoes C—C arranged circularly; a plurality of auxiliary wedges or spreaders D—D; a secondary wedge E; a contractible spring band F; and a main spring G.

The combined friction shell and spring cage A is made in the form of a casting in a well known manner, the friction shell proper being of substantially cylindrical formation and located at the forward end of the casting as indicated at 16. The spring cage or casing is disposed rearwardly of the shell as indicated at 17, the casting being provided with a rear integral wall 18 adapted to act as a follower in coöperation with the rear lugs 12.

The friction shoes C are preferably three in number arranged circularly as shown in Fig. 2. Each of said shoes is provided on its exterior with a cylindrical friction surface coöperable with that of the shell and on its interior, each shoe C is formed with a longitudinally extending surface 19, a wedge surface 20, and an intermediate longitudinally extending surface 21. As shown in Fig. 1, the forward end of the main spring bears against the rear ends of the shoes so as to yieldingly resist relative movement between the shoes and shell.

The main wedge B is preferably in the form of a solid block and is provided with a plurality of wedge faces 22, corresponding in number to the number of the friction shoes and symmetrically arranged with respect to the axis of the mechanism. The secondary wedge E is in the form of a block and on its inner side, that is, the right hand side as viewed in Fig. 1, is provided with a series of wedge faces 23 which directly engage and coöperate with the corresponding opposed wedge faces 20 of the shoes. The outer side, that is, the left hand side as viewed in Fig. 1, of the secondary wedge E is provided with a series of wedge faces 24 adapted to coöperate with corresponding wedge faces 25 formed at the rear ends of the auxiliary wedges D. The forward ends of the auxiliary wedges D are provided with wedge faces 26 which engage and coöperate with the wedge faces 22 on the main wedge B. The auxiliary wedges D are provided with outer surfaces 27 and 28 which engage the surfaces 19 and 21, respectively, of the shoe C.

The releasing spring or band F encircles the auxiliary wedges D and is confined in the space defined by the opposed shoulders 29 and 30 on the auxiliary wedges and shoes respectively. Said band F is of heavy spring metal and preferably rectangular in cross section. As shown, the band constitutes substantially a complete ring except for a slight clearance left between the ends of the band as shown in Fig. 2, the spacing between the ends being sufficient to permit the necessary contraction and expansion of the band, as will be understood. As will be apparent to those skilled in the art, other forms of springs may be used to obtain a similar effect.

A retainer bolt 31 is extended through the main wedge, secondary wedge, the spring and boss in the rear wall of the casting so as to hold the parts in assembled relation and also to maintain the spring under initial compression.

With the construction shown and described, it is apparent, upon compressive action of the mechanism, the main wedge will move inwardly relatively to the shell and thereby spread the outer ends of the auxiliary wedges radially and at the same time tend to force them longitudinally of the friction shoes. This movement will be transmitted in turn to the secondary wedge E which effects a radial spreading pressure on the inner ends of the friction shoes so that the latter are forced radially into tight frictional contact with the shell. Upon release, the band F which is placed under an initial tension when the parts are assembled, will automatically contract and collapse the auxiliary wedges so as to squeeze out the main wedge B and thereby permit sufficient collapse of the spreading mechanism and allow easy and certain release of the entire mechanism.

In the construction illustrated in Fig. 3, the arrangement is substantially the same as that shown in Figs. 1 and 2 except that the rear ends of the auxiliary wedges D' are made flat as indicated at 125 and the outer or lefthand side of the secondary wedge E' is made correspondingly flat or perpendicular to the axis of the mechanism, as indicated at 124. The main wedge B', shoes C', and shell 116 are the same as in Figs. 1 and 2. In this construction, the auxiliary wedges D' are kept slightly spaced from the shoes and the pressure from the auxiliary wedges D' is transmitted through the contractile spring band F' to the shoes.

In the construction illustrated in Fig. 4, the arrangement is substantially the same as that shown in Figs. 1 and 2 except that the auxiliary wedges $D^2$ are provided with inclined wedging faces 50 near their outer ends which coöperate with correspondingly beveled or inclined faces 51 on the outer ends of the shoes $C^2$. With this construction, a true wedging action with which is combined the radial spreading action, is obtained between the auxiliary wedges and the shoes and furthermore the desired effective wedging angle on the shoes can be obtained regardless of the wedging angle on the main wedge $B^2$.

Although I have herein shown and described what I now consider the preferred manner of carrying out the invention, the same is merely illustrative and all changes and modifications are contemplated that come within the scope of the claims appended hereto.

I claim:

1. In a friction shock absorbing mechanism, the combination with a friction shell, friction shoes coöperable therewith, and spring means to yieldingly resist relative movement between the shell and shoes; of a pressure-transmitting main wedge; a plurality of expansible auxiliary wedges interposed between said main wedge and the friction shoes and coöperable with both; and spring means coöperable directly with said auxiliary wedges and exerting radially inwardly directed pressure thereon to effect collapse of the auxiliary wedges upon removal of the actuating pressure.

2. In a friction shock absorbing mechanism, the combination with a friction shell, friction shoes coöperable therewith, and spring means to yieldingly resist relative movement between the shell and shoes; of a pressure-transmitting main wedge; a plurality of expansible auxiliary wedges interposed between said main wedge and the friction shoes and coöperable with both; and spring means coöperable directly with said auxiliary wedges to effect collapse of the latter upon removal of the actuating pressure, said means comprising a substantially annular band encircling the auxiliary wedges.

3. In a friction shock absorbing mechanism, the combination with a friction shell, friction shoes coöperable therewith and having interior wedge faces at their inner ends, converging inwardly of the shell, and spring means for yieldingly resisting relative movement between the shoes and shell; of a main pressure-transmitting wedge; a plurality of independent auxiliary wedges coöperable with said main wedge and the shoes near the outer ends of the latter; a secondary wedge at the inner ends of said auxiliary wedges and coöperable with said wedge faces of the shoes; and spring means coöperable directly with said auxiliary wedges and exerting radially inwardly directed pressure thereon, to effect collapse of the auxiliary wedges upon removal of the actuating pressure.

4. In a friction shock absorbing mechanism, the combination with a friction shell, friction shoes coöperable therewith and having interior wedge faces at their inner ends, and spring means for yieldingly resisting relative movement between the shoes and shell; of a main pressure-transmitting wedge; a plurality of independent auxiliary wedges coöperable with said main wedge and the shoes near the outer ends of the latter; a secondary wedge at the inner ends of said auxiliary wedges and coöperable with said wedge faces of the shoes; and spring means coöperable directly with said auxiliary wedges to effect collapse of the latter upon removal of the actuating pressure, said spring means comprising a contractile spring band encircling the auxiliary wedges and located between the latter and the shoes.

In witness that I claim the foregoing I have hereunto subscribed my name this 8th day of May, 1920.

STACY B. HASELTINE.

Witness:
CARRIE GAILING.